Oct. 23, 1962     L. J. G. BURSKI     3,060,347
ILLUMINATING CONTROL APPARATUS AND METHOD
Filed Dec. 19, 1957     4 Sheets-Sheet 1
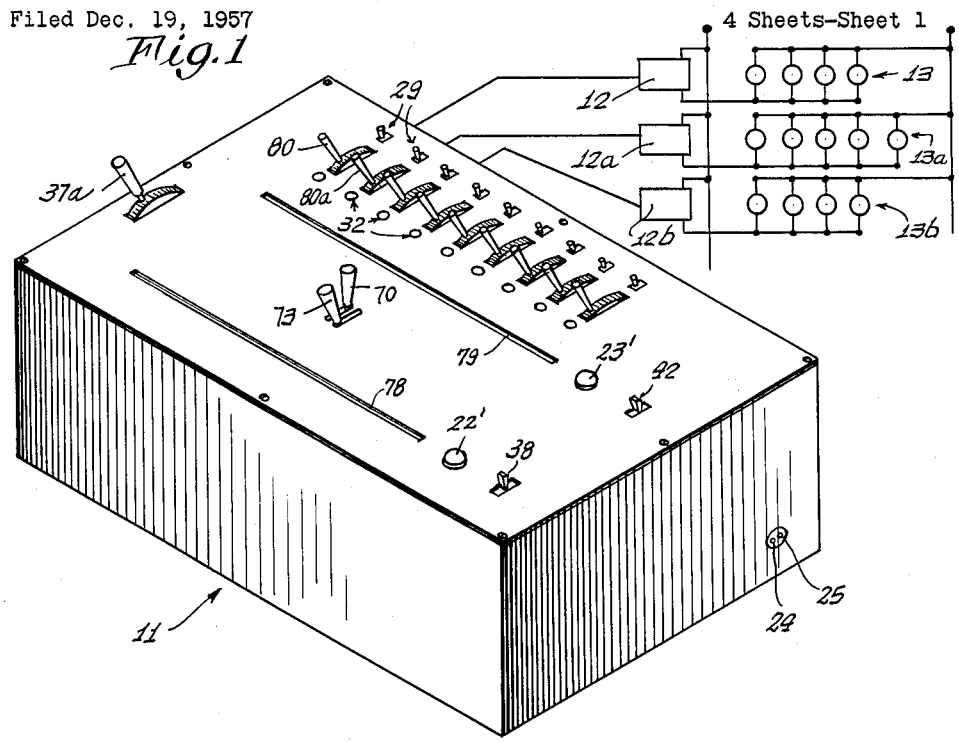
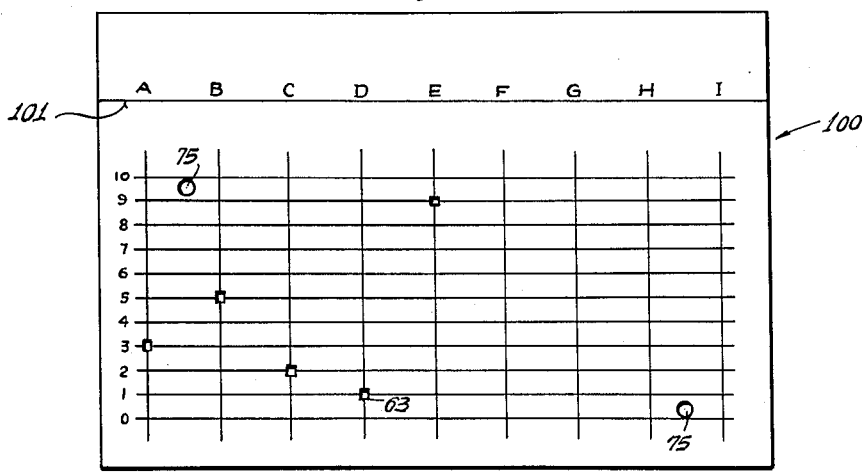
INVENTOR.
Leonard J. G. Burski
BY
Johnson and Kline
ATTORNEYS Oct. 23, 1962     L. J. G. BURSKI     3,060,347
ILLUMINATING CONTROL APPARATUS AND METHOD
Filed Dec. 19, 1957     4 Sheets-Sheet 2

INVENTOR.
*Leonard J. G. Burski*
BY
*Johnson and Kline*
ATTORNEYS

Oct. 23, 1962     L. J. G. BURSKI     3,060,347
ILLUMINATING CONTROL APPARATUS AND METHOD
Filed Dec. 19, 1957     4 Sheets-Sheet 3

INVENTOR.
Leonard J. G. Burski
BY
Johnson and Kline
ATTORNEYS

Oct. 23, 1962 L. J. G. BURSKI 3,060,347
ILLUMINATING CONTROL APPARATUS AND METHOD
Filed Dec. 19, 1957 4 Sheets-Sheet 4
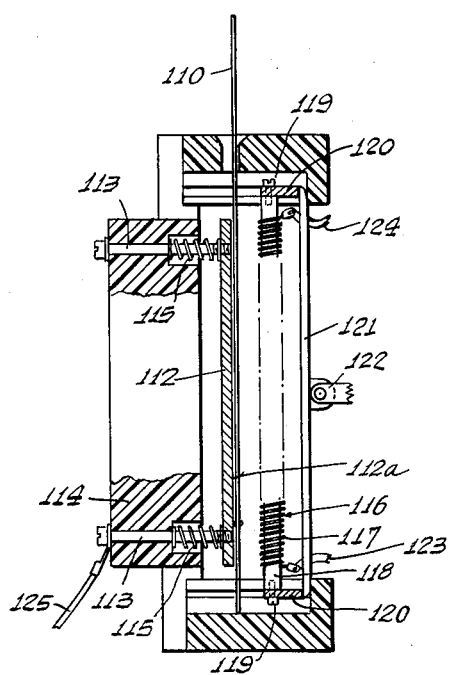
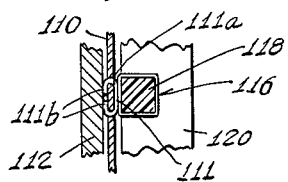
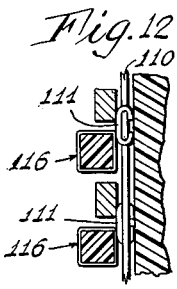
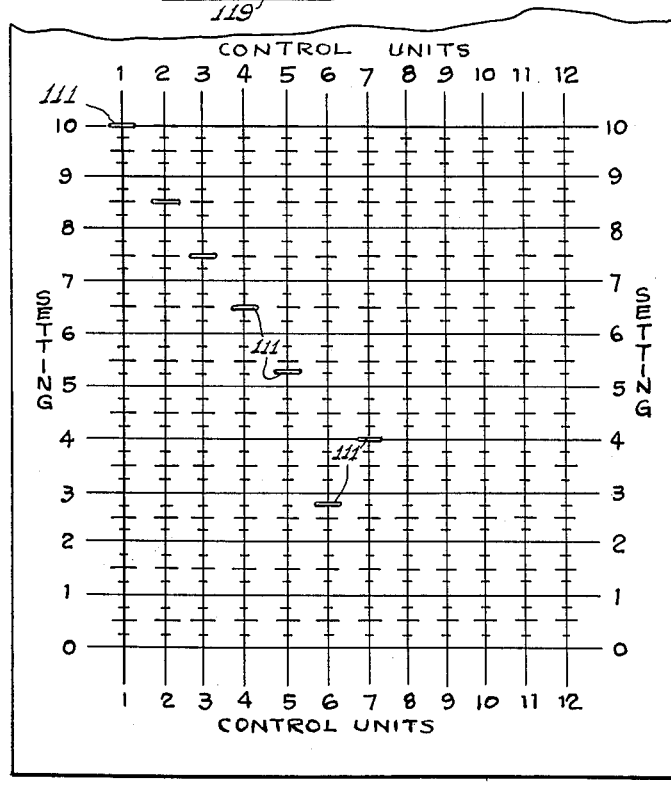
INVENTOR.
Leonard J. G. Burski
BY
Johnson and Kline
ATTORNEYS

United States Patent Office 3,060,347
Patented Oct. 23, 1962

3,060,347
ILLUMINATING CONTROL APPARATUS AND METHOD
Leonard J. G. Burski, Bristol, Conn., assignor to The Superior Electric Co., Bristol, Conn., a corporation of Connecticut
Filed Dec. 19, 1957, Ser. No. 703,826
12 Claims. (Cl. 315—316)

The present invention relates to a method and apparatus for controlling the amount of illumination from an electrical lighting system and more particularly to the controlling of the illumination from a plurality of individually controllable lamp loads.

The apparatus and method of the present invention has particular utility in locations such as theaters, stages, etc. wherein the amount of illumination from a large lighting system is changed from one value to another, either instantaneously or gradually, innumerably within a short period. In order to achieve such results, there is generally provided a lighting system which consists of a plurality of individually distinct lamp load circuits. Each circuit includes a lamp load consisting of at least one electric light, a variable power unit which controls the amount of electrical current to the lamp load and hence the brilliancy thereof, and a manually operable control unit which serves to regulate the value of the power unit.

During an actual production on the stage, the variations in illumination by the lighting system follow a preselected plan or program since each value of illumination for each part of the production or scene has been predetermined. To attain the desired illumination of each scene, the control unit of each lamp load circuit is manually adjusted to its predetermined positioned in which the illumination from its lamp load is at the desired level. However, since it is necessary to shift from one value of scene illumination to the next either instantaneously or gradually, the control units for the next scene must be manually set prior to switching to the next scene. This is accomplished by providing at least two control units in each lamp load circuit and switches for switching the control of the power unit from one control unit to the other. Normally, however, the program requires that one scene be of such limited duration that the operator has insufficient time to set the control units for the succeeding scene. Thus a third control unit in each lamp load circuit is needed to provide the required flexibility in the system but in large lighting systems, even three control units per lamp load circuit have been found to be insufficient. For example, in a fairly complete control apparatus there may be as many as seven control units for each lamp load circuit and up to 40 or 50 different lamp load circuits each, of course, with seven control units apiece. The control apparatus accordingly becomes exceedingly complex, expensive and bulky in addition to being costly to operate and maintain.

An object of the present invention is to provide a novel and improved method and apparatus for controlling the variations in illumination from a lighting system.

A further object of the present invention is to provide a compact, relatively inexpensive and easily operated apparatus by which a substantially large lighting system may be easily controlled.

In carrying out the present invention there is provided a method and apparatus whereby the setting of the control units for each scene is recorded as information on a storage unit. While the information may be stored by magnetizing, deforming, or altering of conductivity of a member, in one specific embodiment hereinafter illustrated, the information is stored on a card by perforating the card while in another embodiment, the information is in the form of conductive segments attached to a card, both being located at determinate positions on the cards. These cards are utilized in a control apparatus which includes card sensing means which translate the information on the cards into regulation of the variable power units and hence the amount of illumination from the lamp loads. Each sensing means constitutes a substitute for a bank of control units and thus includes the equivalent of a manually operable control unit for each lamp load circuit. Accordingly, with two sensing means, it is possible to switch from one to the other and thus change the value of illumination of the complete lighting system from that stored on one card to that stored on the other by a simple, substantially instantaneous operation without requiring the individual, manual presetting of a plurality of control units. The illumination of the entire production may thus be programmed on cards with each card storing the illumination for a scene and when the cards are sequentially positioned in the sensing means the necessary control of illumination from the lighting system is thereby easily provided. While only two sensing means are hereinafter shown and described, it will be apparent that, depending on the required flexibility of the control apparatus, only one or more than two may be employed without departing from the scope of the present invention.

The control apparatus of the present invention in addition to the sensing means further includes one manually adjustable control unit in each lamp load circuit. The manual control unit is preferably used during rehearsals or when the illuminating program is being set up for manually selecting the desired value of illumination from each lamp load for each scene. The value selected for each control unit is then stored on the card for that scene by perforating or by attaching conductive segments on the card at a position which corresponds to the setting of that control unit. This is repeated for each scene, and the cards preferably numbered so that they may be sequentially utilized.

Other features and advantages will hereinafter appear.

In the drawing:

FIGURE 1 is a perspective view of the control apparatus of the present invention with the variable power units being shown in block form and the lamp loads being shown schematically.

FIG. 2 is a front view of one embodiment of a card used in the present invention for storing the information.

FIG. 3 is an electrical schematic diagram of the circuitary of two lamp load circuits.

FIG. 4 is an elevation of one embodiment of a brush utilized in the sensing means of one embodiment of the present invention.

FIG. 5 is a section of the brush shown in FIG. 4.

FIG. 6 is a side view partly in section showing a brush and a resistor with a card being positioned therebetween.

FIG. 9 is a view of a card used in another embodiment of the present invention in which the information is stored in the form of conductive segments attached to the card.

FIG. 10 is a partial section showing the card of FIG. 9, positioned within a control apparatus.

FIG. 11 is an enlarged detail of the apparatus in FIG. 10.

FIG. 12 is a detail section similar to FIG. 11 only showing a different positioning of the elements.

Figure 7:
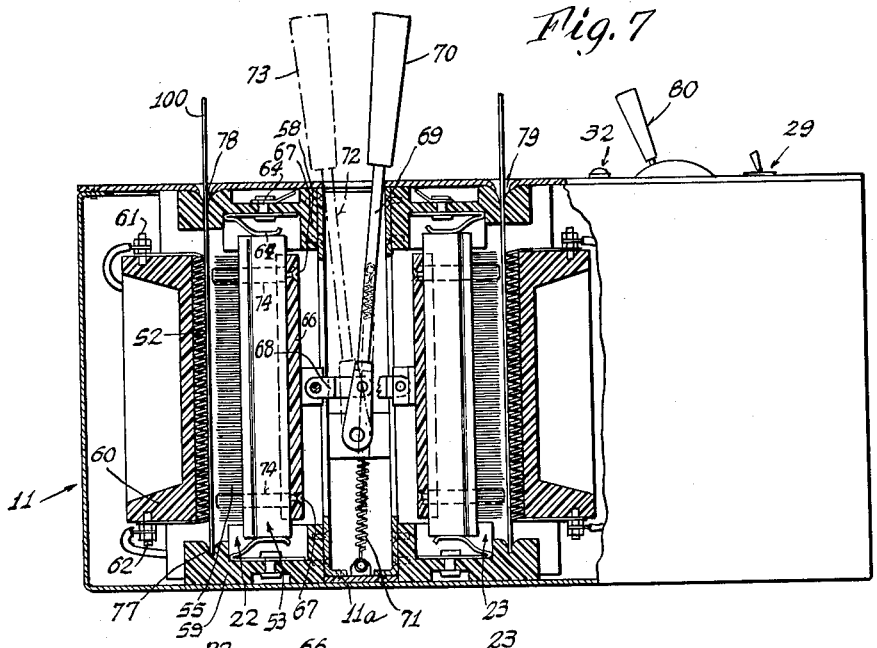
FIG. 7 is a partial vertical section of the control apparatus shown in FIG. 1.

Referring to the drawing, the variable illumination control system of the present invention consists of a plurality of individual lamp load circuits 10, each lamp load circuit including control units all of which are conveniently mounted in a control panel (generally referred to by the reference numeral 11 and shown perspectively in FIG. 1), a variable power unit 12 and a lamp load 13. As shown schematically in FIG. 1, the lamp loads 13, 13a, 13b are connected through their respective variable power units 12, 12a, 12b to leads 14 and 15 which are connected to a source of electrical energy, preferably A.C. It will be appreciated that each power unit 12 serves to control the amount of electrical energy from the leads 14 and 15 to its respective lamp load and hence the brilliancy of the lamp load. While only three lamp load circuits have been shown, the present invention is not to be considered limited thereto since it is applicable to any number of circuits. The panel 11, moreover, illustrates sufficient control units to operate 9 lamp loads as will be hereinafter apparent.

In order to facilitate the comprehension of the electrical interconnection between the various elements of the lamp load circuits, reference is made to FIG. 3 which is a schematic electrical diagram showing the connections for two complete lamp load circuits. Additional lamp load circuits, which are merely repetitious of the two completely shown, may be connected in a similar manner to form the complete illumination control system. The lead 15 is connected to one side of a plurality of electric bulbs 16 which constitute the lamp load 13, and which may vary in number between one and the maximum rating of the circuit and on the other side the bulbs are connected serially through a pair of gate windings 17 to the lead 14. The variable power unit 12 which includes the windings 17 is, in the specific illustrated embodiment of the invention, a saturable reactor and hence has a control winding 18 with the windings 17 and 18 being wound on a magnetic core in a manner well known in the art. The impedance of the saturable reactor varies inversely with the value of current flowing in the control winding 18 and hence the luminosity of the lamp loads is regulated by the amount of control current in the control coil 18. While a specific example of a variable power unit has been shown, it is within the scope of the present invention to utilize other electrical devices for controlling power such as electro-mechanical devices, grid controlled gaseous discharge tubes, variable resistances or other conventional and well known devices which are responsive to variations either in magnitude or phase angle of a control current or voltage.

The value of the current through the control winding 18 of each lamp load circuit 10 is regulated by the control units of the circuit and in the specific embodiment shown there are three control units 19, 20 and 21 in each lamp load circuit. Each unit is in effect a rheostat having a tap variably positionable on a resistance element. It will be appreciated that the relative position of the tap on the resistance determines the amount of control current which may flow through the control winding 18. The control unit 19 is manually operable while the control unit 20 forms part of a first sensing means 22 and the control unit 21 forms part of a second sensing means 23.

The resistance element 19' of the manually operable control unit 19 is energized by a pair of leads 24 and 25 which are connectible to a source of electrical energy, such as 18 volts preferably through an on-off switch (not shown). The lead 25 and the tap 19" of the control element are connected to the input of a full-wave rectifier 26 whose output through leads 27 and 28 terminates in terminals on multiple-contact switch 29. Switch blades 30 and 31 of the switch 29 are connected to the control winding 18 such that when they are in contact with leads 27 and 28, the voltage from the control unit 19 is impressed on the control winding. A pilot light 32 for indicating energization of the control unit 19 is connected between the leads 24 and 25 through a terminal and switch blade 33 of the switch 29 so that when the switch blades 30 and 31 are in contact with leads 27 and 28, the pilot light 32 is energized. It will be apparent that all three switch blades 30, 31 and 33 are mechanically interconnected to operate together; also that a single, half-wave rectifier may be used in place of the full-wave rectifier 26 shown. Similarly the control unit 19a is energized by the leads 24 and 25 and is identical to the control unit 19 and serves to control the intensity of the lamp load 13a with the elements thereof being the same as in control unit 19 with like elements having the same reference character followed by the postscript letter "a".

The control units 20 and 21 are also energized from the leads 24 and 25. However, there are connections which enable the sensing means 22 and 23 to be energized or deenergized independently of each other and to be both energized at the same time and permit "fading" the lamp load control from the value of one to the value of the other. To this end there is provided leads 34 and 35 connected to the leads 24 and 25 respectively. Positioned across the leads is an autotransformer 36 having a brush 37. The lead 34 terminates in one contact of a single pole triple throw switch 38 and the lead 35 terminates in another contact of the switch. The blade of the switch 38 may either be in contact with the lead 34, an "off" contact 39, or the lead 35. Similarly sensing means 23 has a lead 40 connected to the lead 34 and a lead 41 connected to the lead 35 with leads 40 and 41 terminating in contacts on a switch 42 having an "off" contact 43.

A bus 44 is connected to the switch blade of the switch 38 and a bus 45 is connected to the brush 37 of the autotransformer 36. Similarly in sensing means 23 a bus 46 is connected to the switch blade of the switch 42 and a bus 47 is connected to the bus 45 which is in effect a connection to the brush 37. The control units 20 and 21 each terminate in rectifiers 48 and 49 respectively which have their outputs joined by leads 50 and 51 and these leads terminate in contacts in switch 29. The control units 20a and 21a are likewise connected in the lighting circuit 10a across the buses 44 and 45 and 46 and 47 respectively with like elements being given the same reference number followed by the postscript letter "a". Each sensing means has a pilot light 22' and 23' connected across the buses to indicate energization of the sensing means.

In the operation of the control unit 10, when it is desired to manually control the intensity of the lights 16 by the control unit 19, the switch 29 is thrown so that the switch blades 30, 31 and 33 are in the solid line position. Current can flow from the leads 24, 25 through the tap 19" and the lead 25 to the rectifier 26 and through the leads 27 and 28, switch blades 31 and 30 to the control winding 18 of the power unit 12.

If it is desired to have the first sensing means 22 control the light intensity, as for example unit 20, the switch 29 is shifted to the dotted line position which connects the control winding 18 to the leads 50 and 51. To energize the sensing means, switch 38 is thrown to be in contact with lead 34, switch 42 is at the "off" contact 43 and the brush 37 is in contact with the lead 35. Accordingly current can flow through the lead 34, switch 38, lead 44, tap 20", rectifier 48, leads 50, switch 29, control winding 18 and back through the switch blade 30, lead 51, rectifier 48 to the bus 45, the brush 37 to the lead 35. When the switch 29 is in the dotted line position, the manual control unit 19 thus has no effect on the light intensity of the lamp load 13 and since the switch 42 is at its off position, no current flows to the sensing means 23. Each control unit 19, 19a, etc. in the first sensing means accordingly controls its associated lamp load, 13, 13a, etc.

If it is desired to have the second sensing means 23 such as control unit 21 controlling the intensity of the lamp load 13, the switch 38 is thrown to its off position and the switch 42 is thrown to be in contact with lead 40. Accordingly current will flow in the manner similar to that described in connection with control unit 20 in the control units 21, 21a of the second sensing means 23.

The "fading," i.e. the gradual shifting of the control from one sensing unit to another, is accomplished in the following manner and attention is also directed to my copending application, Serial Number 601,507, filed August 1, 1956, now Patent No. 2,885,598, issued May 5, 1959. With the brush 37 in contact with the lead 35, the switch 38 is thrown to be in contact with the lead 34 and the switch 42 thrown to be in contact with the lead 41. Movement of the brush 37 along the autotransformer from contact with the lead 35 to the lead 34 winding will shift the control from the unit 20 to the unit 21. If the brush 37 is in contact with the lead 34 and left there, as indicated in the dotted line position, then in order to have the control unit 20 energized, the switch 38 has to be in contact with the lead 35. While, if it is desired to energize control unit 21, the switch 42 has to be in contact with the lead 41 rather than with the leads 34 and 40 as above recited.

It will be appreciated that the control units 20a and 21a are similarly connected to the buses 44 and 45 and 46 and 47 respectively and operate their lamp loads 13a through their switch 29a in the same manner as do the control units 20 and 21 for the lamp load 13. Thus the switches 38 and 42 and the autotransformer 36 serve to control completely all the control units in each sensing means.

At times it is desirable that while a complete sensing means may be in control of all the lamp loads that one lamp load, by switching, can be shifted to be controlled by its manual control unit, as for example the unit 19. This is easily accomplished, according to the present invention, merely by switching the switch 29 from contact with the leads 50 and 51 to contact with the leads 27 and 28. Accordingly the circuit of the present invention provides for the individual decontrol (since each lighting circuit has a switch 29) of each lamp load from its sensing means to the manual control unit of the lamp load. It will, of course, be appreciated that it is immaterial which sensing means or both are energized since the switch 29 opens the circuit between both of them and the control winding 18.

The control units 20, 20a, 21, 21a, etc. in both sensing means are all identical with each other and mechanically consist of an elongate, helically wound wire resistor 52 and a brush 53. The resistor 52 and the brush 53 are the mechanical structures of one embodiment of the invention corresponding to the schematically shown resistance elements 20', 21' and taps 20" and 21" respectively, hereinbefore referred to in connection with FIG. 3.

A card 100 is positioned between the brush 53 and the resistor 52 and the card carries information in the form of a punched hole indicating the value of control current which is needed to supply the required illumination. Then the brush is moved against the card and the portion of the brush aligned with the hole in the card passes through the hole and electrically engages that portion of the resistor opposite thereto to thereby supply the desired amount of control current. To this end, as shown in FIGS. 4, 5 and 6, the brush 53 is composed of support 54 formed from a length of electrical conducting material, such as sheet copper, having the cross-sectional shape shown in FIG. 5. Projecting from the open longitudinal edge of the brush are fine electrical conductive wires 55 which are reversely bent around a pin 56 and contained in place by crimping as at 57 of the support 54 thereabout. The wires 55 are substantially evenly spaced along the length of the support and extend for a substantial length of the brush and project outwardly therefrom. They are sufficiently resilient and flexible to permit a slight bending thereof when they engage the card without permanent deformation.

As shown in FIG. 6, the brush 53 is mounted for movement, which may be arcuate but in the specific embodiment shown is reciprocating, toward and away from the card 100 and the resistor 52. To this end the brush is mounted in a groove formed in top and bottom supports 58 and 59 respectively opposite an insulating block 60 on which the resistor 52 is mounted. The brush in FIG. 6 is shown engageable with the resistor as it would be when it is in control of its lamp load. Thus electrical current can pass through the resistor 52 by means of leads which connect upper and lower terminals 61 and 62 respectively of the resistor 52 to the desired buses. The card 100 has a hole 63 through which selected wires 55a of the brush pass to engage the resistor 52 opposite the hole 63 with the other wires of the brush being maintained out of contact with element 52 by the card. Accordingly current can flow from the buses, to which the terminals 61 and 62 are connected, through the resistor 52, through the wires 55a of the brush 53 contacting the element 52 and through the brush support 54 to a bent spring 64 contacting the top end of the brush and thence to a terminal 65 connected thereto. The terminal 65 is connected to the desired bus.

It will thus be appreciated that the brush will contact the resistor 52 only at the position permitted by the hole 63 in the card 100 and this in turn will determine the amount of control current passing through the brush and hence to the control winding 18.

Figure 8:
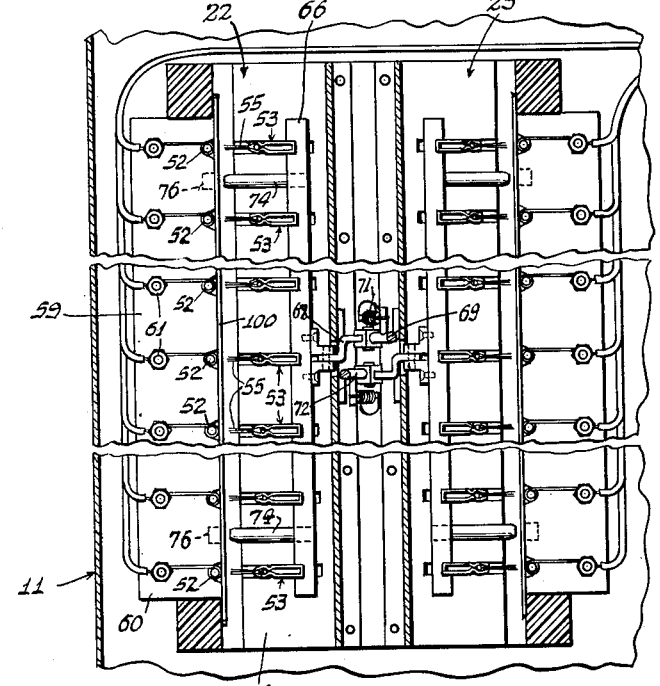
FIG. 8 is a partial plan view thereof partly in section.

While separate cards could be used for each control unit, the present invention provides for only a single card to carry the information for one sensing means having a plurality of control units. Accordingly the first sensing means 22 includes a bank of control units 20, 20a, etc. operable together by a single control element while the second sensing means includes a bank of control units 21, 21a, etc. also operable together. As shown in FIGS. 7 and 8, there is provided in the sensing means 22 a length 66 of insulating material, such as a plastic, to which the brushes are connected as by screws 67 in parallel aligned relation but spaced and electrically independent of each other. The length 66 has connected thereto a link 68 which in turn is connected to a pivoted lever 69 which extends out of the control panel 11 and terminates in a handle 70. To assure a constant forcing of the brushes against the resistors, an over-center spring 71 is connected between the lever 69 and the base 11a of the control panel 11. Mounted opposite the brushes in aligned relation therewith are the resistors 52 which cooperate with their respective brushes 53. The resistors 52 are all mounted on the block 60 to be supported thereby, electrically independent from each other. The block 60 is secured to the panel 11 in any convenient manner.

It will thus be appreciated that by movement of the handle 70 towards the resistors 52 that the brushes 53 will be caused to move thereagainst and thus cause sensing of the information on the card. Similarly the second sensing means 23 is a mirror image of the first in that it consists of banks of control units having stationary resistors and movable brushes with the brushes being operated by a lever 72 having a handle 73 which projects out of the control panel 11.

In order to assure that the card 100 when positioned in the sensing means is located correctly, there is attached to the brush carrying lengths 66 a pair of locator pins 74 which are adapted to extend when the sensing means is closed through apertures 75 in the card 100 and into receiving holes 76 in the resistance element block 60. Moreover, the ends of the pins normally extend slightly beyond the ends of the brushes to prevent injury thereto by the card when it is being inserted or removed from the sensing means. The pins 74 are eccentrically located as are the apertures 75 to prevent a card from being utilized when it is inserted backwardly or upside down. Also serving to properly position the card is a longitudinal slot 77 formed in the bottom support member 59 which receives the bottom edge of the card while the block 60 and upper support member 58 along with the control panel define therebetween an entrance slot 78 for supporting the top portion of the card. The second sensing means 23 has similar pins and slots with its entrance slot in the control panel being indicated by reference numeral 79.

As shown in FIG. 1, the control panel 11 groups the two sensing means, the manual control units, switches, indicating lights, autotransformer 36, etc. into a convenient, compact, one piece assemblage. However, it is within the scope of the present invention to make each sensing means, each manually operable control unit, the autotransformer, etc. self-contained so that the control panel can be formed by assembling independent distinct units in order to permit standardization in manufacture of the various elements without decreasing flexibility in designs and fabrication of the control panel. In the specific embodiment of control panel shown, other than the structure heretofore mentioned, there is provided handles 80, 80a, etc. which operate the taps 19″ of the manual control units 19. Also the indicating lights 32 and the operating handles of switches 29 are aligned and positioned adjacent their respective control handles 80, 80a, etc. The operating levers of switches 38 and 42 of the sensing means 22 and 23 are positioned adjacent their respective slots 78 and 79 respectively together with the indicating lights 22′ and 23′.

In use, the panel is energized from the source by the leads 24 and 25 and since it is initially desired to have the manual control units 19, 19a control the lamp loads the switches 29 are moved to connect the control windings to these units. Each unit is then adjusted by its handle 80, 80a, etc. to control the amount of light desired from its respective lamp load 13, 13a, etc in order to select the amount of total illumination on the area desired. The manually operable control units are indexed from 0 to 10 and accordingly the value of their setting is easily readable. The value of each setting is then noted and the card 100, as shown in FIG. 2, is perforated at the position which corresponds to the setting. Thus the card 100 has vertical lines numbered A, B, C, D, etc. which are used to indicate lamp load circuits 10, 10a, 10b, etc. respectively which they control, and horizontal lines numbered 0 to 10 which correspond to values of the setting of manually operable control units. Thus the value of manual control unit 19 is punched on the line "A," value of unit 19a is punched on line "B" and so forth until the settings of the control units are stored on the card. Naturally if the setting of a unit is zero then no hole is punched.

The card 100 is formed from relatively stiff thin material, such as cardboard, in order to provide ease of handling, relative long life and prevention of the wires of the brushes from passing therethrough. Moreover the card has a horizontal line 101 which is adapted to coincide with the top of the panel 11 defining the slots 78 and 79 to provide a visible indication to the operator that the card is correctly positioned in the sensing means. After the values of the settings of manually operable members 19 have been stored on the card by perforating it, the card can then be utilized in either sensing means 22 or 23 to provide the same amount of total illumination as that which the same settings of the manual control units would provide.

Preferably during rehearsals the values of illumination for each scene are determined and stored on sequentially numbered cards so that during the program the cards may be sequentially used in the sensing means. Accordingly after the programming of the illumination values for each scene on cards, the first card for the first scene is positioned in the slot 78 of the first sensing means and the second card in slot 79 of the second sensing means with the handles 70 and 73 being thrown to cause the portion of the brushes to pass through the apertures in the card 100 and engage the resistors 52. The switches 29 are thrown to deenergize the manual control units 19 and connect the control windings to the sensing means. The tap of the autotransformer is positioned by movement of its handle 37a to an end position to be in contact with the lead 35, the switch 38 is thrown to have its blade connected to the lead 34 and the switch 42 is left in its open position. Accordingly the first sensing means assimulates the values stored on the card 100 and thereby adjusts the amount of illumination of the lamp loads to that value.

When it is desired to shift the illumination to that required for the next scene stored on a card (#2) positioned in slot 79 of the second sensing means 23 switch 38 is opened and switch 42 is thrown to have its blade contact lead 40 to make the value of illumination responsive to the information on card #2. While card #2 is in control, card #1 is removed from slot 78 by movement of the handle and card #3 inserted therein and the operation of the switches 38 and 42 is repeated by opening switch 42 and closing switch 38 to shift the control from card #2 to card #3. These series of operations are repeated by sequentially using the cards in order to provide the desired illumination for each scene.

If at any time it is desired to fade or proportionally gradually shift the control from one value of illumination to the other, the cards containing the two values are placed in the slots 78 and 79. Switches 38 and 42 are thrown to be in contact with leads 34 and 41 respectively when the tap 37 of the autotransformer 36 is in engagement with the lead 35 to energize both sensing means. The tap 37 of the autotransformer 40 is moved, as by the handle 37a from one extreme to the other which gradually or substantially instantaneously depending on the speed of movement of the handle 37a shifts the control from the value of illumination stored on the card positioned in the first sensing means 22 to the value of illumination stored on the card positioned in the second sensing means 23. If desired to shift from the second sensing means to the first, then the tap 37 has to be engaged with lead 34 and moved to engagement with the lead 35. However, if the tap 37 engages lead 34 and it is desired to fade from the first sensing means to the second, the switches 38 and 42 are thrown to have their blades engage leads 35 and 40 respectively. Thus the switches 38 and 42 enable fading from one sensing means to the other for both directions of movement of the tap 37 along the autotransformer 36.

It will moreover be appreciated that while one of the sensing means is in control of the total lamp load circuits that each lamp load circuit individually may be controlled by its manual control unit 19, 19a, etc. Thus, if the first sensing means is in control and if it is desired to shift the control of the lamp load 13 to the manual control unit 19, then the switch 29 is thrown to disconnect the sensing means from the control winding and to connect the control unit 19 thereto. Thus one or more of the lamp load circuits can be manually controllable when the sensing means are in control of the lamp loads.

While FIG. 1 shows the row of manual control units 19 and the slots 78 and 79 of the sensing means as being substantially the same lengths for clarity of explanation, in an actual device the slots would be substantially shorter than the row of units 19.

Shown in FIG. 9 is a card 110 which is utilized in another embodiment of the present invention. This card differs from the card 100 in that instead of having perforations through which electrical contacting members may extend, selected portions of the card are electrically conducting. While this conductivity may be accomplished, for example by removal of an insulating film on a conductive surface, in the instant embodiment an electrically conductive segment consisting of a small wire 111, such as a staple, is attached to the card and has a bight portion 111a on one side of the card and end portions 111b on the other side. The blank forming the card is of relatively stiff, thin, insulating material such as stiff paper.

Shown in FIG. 10 is a sectional view similar to that of FIG. 6 showing one control unit of a sensing means which is used to assimulate the values of illumination stored on the card 110. A brush 112 consists of a solid length of electrical conducting material such as brass, which is mounted by screws 113 on a block 114 of insulating material so that the brush has a flat surface 112a opposite the block. Springs 115 surround the screws 113 to provide for resilient mounting of the brush 112. Mounted opposite the brush 112 is a resistor 116 consisting of a length 117 of resistance wire helically wound on an insulating core 118. Screws 119 are threaded into the end of the core 118 to hold the same on support plates 120 which in turn are connected together by an interconnecting member 121. The resistor 116 is mounted for movement toward the brush and hence has a pivotal connection 122 which is adapted to be connected to either of the levers 70 or 73 for operation in a manner similar to that shown heretofore for the embodiment of the invention previously described.

Wires 123 and 124 are connected to the ends of the resistance wire 117 while a wire 125 is connected through one of the screws 113 to the contact brush. Since the ends of the screws are threaded into the brush 112, electrical contact is established. The control units of this embodiment are electrically connected in the same manner as the previously described control units.

As shown in FIG. 11, with the card 110 positioned between the brush 112 and the resistor 116 and the resistor forced against the card, electrical contact will be made between the bight portion 111a of the segment 111 and the portion of the resistor 116 adjacent thereto. The segment 111 will conduct current through the card and through its end portions 111b to the brush 112 and hence to the output lead 125. Accordingly it will be appreciated that the amount of current passing between the resistor 116 and the brush 112, is dependent on the relative positioning of the segment with respect to the resistor. The card shown in FIG. 9 and the sensing means shown in FIGS. 10 and 11 constitute a different embodiment of the brush, card and resistor elements of the embodiment shown in FIGS. 1 through 8.

Shown in FIG. 12 is a further embodiment of the present invention in which the resistor elements are mounted on one side of the card 110 and alternately disposed therebetween are the brush elements. In this embodiment the electricity is conducted solely on the bight portion of the segment and hence in place of the wire segment, a type of conducting media may be used which does not have portions extending on opposite sides of the card.

It will thus be appreciated that there has been disclosed a novel and improved method and apparatus for controlling the total amount of illumination from a lighting system by individually controlling the amount of light from each of a plurality of lamp load circuits. The controlling of the circuits is easily and quickly accomplished by having the value of illumination for each lamp load circuit of one sensing means stored on a card and then by switching, shifting the value of illumination of the lamp loads to that stored on the card. The apparatus of the present invention, by eliminating innumerable controls which have to be manually operated, is thus much less bulky, easier to operate and more economical to manufacture without any loss in the desired flexibility of the lighting system.

Variations and modifications may be made within the scope of the claims and portions of the improvements may be used without others.

I claim:

1. An illuminating control apparatus for controlling the amount of illumination from a lighting system comprising a lamp load circuit including an electric lamp load, power means responsive to a control current for controlling the amount of energy to the lamp load electrically interconnected between a source of energy and the lamp load circuit, and a pair of sensing means, each sensing means being responsive to information stored on storage means for supplying the necessary control current to the power means for producing the desired amount of illumination from the lamp load; means for connecting both sensing means to the power means at the same time; and manually operable means for increasing the amount of control by one sensing means over the power means while decreasing the amount of control by the other sensing means over the power means whereby the value of illumination may be gradually shifted from the value stored on one storage means to the value stored on the other storage means.

2. An illuminating control apparatus for controlling the amount of illumination from a lighting system comprising a lamp load circuit including an electric lamp load, power means responsive to the value of a control current for controlling the amount of energy to the lamp load electrically interconnected between a source of energy and the lamp load circuit, manually adjustable means for supplying a control current which produces the desired amount of illumination from the lamp load, sensing means responsive to information stored on storage means for supplying substantially the same value of control current to the power means for producing the same desired amount of illumination from the lamp load; and switch means for connecting either the manually adjustable means or the sensing means to the power means.

3. An illuminating control apparatus for controlling the amount of illumination from a lighting system comprising a lamp load circuit including an electric lamp load, power means responsive to a control current for controlling the amount of energy to the lamp load electrically interconnected between a source of energy and the lamp load circuit, manually adjustable means for supplying an adjustable value of control current to adjust the amount of illumination from the lamp load, a pair of sensing means, each sensing means being responsive to information stored on storage means for supplying the necessary control current to the power means for producing the desired amount of illumination from the lamp load; and switch means for connecting either the adjustable means or either of the sensing means to the power means to cause control of the lamp load thereby.

4. The method of adjusting the total amount of illumination from a plurality of electrical lamp loads from one total value to another comprising the steps of initially determining the value of each amount of illumination for each lamp load for both total values, storing on one card means the value for each lamp load for one value of total illumination, storing on a second card means the value for each lamp load for the other value of total illumination, assimulating all the value on one card means at the same time to adjust the amount of illumination from each lamp load thereto to create the total value of illumination, positioning the second card means in position to be assimulated and switching to assimulate all the value on the second card means at the same time to adjust the amount of illumination from the lamp loads thereto, and releasing the control of the lamp loads by the first card means 5. The invention as defined in claim 4 in which the switching to adjust the lamp loads to the value of the second card means is accomplished substantially simultaneously with the release of control of the lamp loads by the first card means.

6. The method of adjusting the total amount of illumination from a plurality of electrical lamp loads from one total value to another comprising the steps of initially determining the value of each amount of illumination for each lamp load for both total values, storing on one card means the value for each lamp load for one value of total illumination, storing on a second card means the value for each lamp load for the other value of total illumination, assimulating all the values on one card means at the same time to adjust the amount of illumination from each lamp load thereto to create the total value of illumination, positioning the second card means in position to be assimulated and switching to assimulate all the values on the second card means at the same time to adjust the amount of illumination from the lamp loads thereto, and releasing the control of the lamp loads by the first card means, and in which the switching to adjust the value of the lamp loads to the second card means is gradual and the control of the lamp loads by the first card means is gradually released.

7. An illuminating control apparatus for adjusting the total amount of illumination from a lighting system from one value to another comprising a plurality of lamp load circuits; each of which includes a lamp load and power means responsive to a control current for controlling the amount of energy to the lamp load electrically interconnected between a source of energy and the lamp load circuit; a first and a second card means with each card means having information thereon indicative of the value of the control current for each power means for each value of illumination; sensing means electrically connected to the power means and responsive to the information on the card means for supplying the necessary amount of control current to each power means for producing the desired amount of illumination from each lamp load; and means for switching the control of the lamp loads from one card means to the other.

8. The invention as defined in claim 7 in which the switching means enables simultaneous disconnection of the control of the lamp load by one card means as it connects the control of the lamp load by the other card means.

9. The invention as defined in claim 7 in which the switching means connects both card means to control the lamp load and in which the switching means includes manually operable means for gradually increasing the control of the lamp load by one card means as the control of the lamp load by the other card means is decreased.

10. An illuminating control apparatus for controlling the amount of illumination from a lighting system comprising a plurality of independent lamp load circuits; each of which includes a lamp load, power means responsive to a control current for controlling the amount of energy to the lamp load, connections connecting the power means between the lamp load and a source of energy, and manually operable control means for controlling the power means; card means having information thereon indicative of the value of the control current for each power means; sensing means responsive to the information on the card means for supplying the necessary control current to each power means for producing the desired amount of illumination from each lamp load; and switch means for controlling the lamp loads by connecting to the power means either the manually operable control means or the sensing means.

11. The invention as defined in claim 10 in which at least one lamp load circuit includes a switch for disconnecting the sensing means from control of the lamp load and connects the manually operable control means to control of the lamp load, whereby operation of the switches enables control of the same lamp load by the manually operable control means while the other lamp load circuits are under the control of the sensing means.

12. In a lighting system having a lamp load in which the amount of illumination therefrom can be adjusted by the value of a control current, the improvement comprising card means having information stored thereon indicative of the amount of illumination from the lamp load, and sensing means responsive to the information on the card for producing a control current having a value sufficient to provide the desired amount of illumination from the lamp load, said sensing means including an elongate resistance element connectible to a source of electrical energy, a brush, and a lever for relatively moving the element and brush together into or out of electrical engagement with the card means being positioned therebetween.

References Cited in the file of this patent

UNITED STATES PATENTS

| | | |
|---|---|---|
| 449,044 | Johnson | Mar. 24, 1891 |
| 777,116 | Louis | Dec. 13, 1904 |
| 1,166,030 | Willower et al. | Dec. 28, 1915 |
| 1,193,138 | Hanson | Aug. 1, 1916 |
| 1,622,901 | Beswick | Mar. 29, 1927 |
| 1,683,059 | Van Deventer | Sept. 4, 1928 |
| 1,962,335 | Wensley | June 12, 1934 |
| 2,286,812 | Keefe | June 16, 1942 |
| 2,353,061 | Oldenboom | July 4, 1944 |
| 2,786,968 | Kabak | Mar. 26, 1957 |